Patented Dec. 30, 1947

2,433,395

UNITED STATES PATENT OFFICE 2,433,395

PROCESS FOR PRODUCTION OF OXYGENATED SULFUR COMPOUNDS

Wayne A. Proell, Chicago, Ill., and Bernard H. Shoemaker, Hammond, Ind., assignors to Standard Oil Company, Chicago, Ill., a corporation of Indiana No Drawing. Application January 1, 1945, Serial No. 571,023

22 Claims. (Cl. 260—513)

This invention relates to an improved oxidation process. More particularly it relates to a process for the catalytic oxidation of organic sulfur compounds having the general formula $R_1S_nR_2$ wherein $R_1$ and $R_2$ are organic radicals and "$n$" is an integer having a value between 1 and 6, inclusive.

It is an object of this invention to provide a novel process for the oxidation of organic sulfur compounds. Another object of this invention is to provide novel and efficient catalysts for the oxidation of organic sulfur compounds. Still another object is to provide a catalytic oxidation process for the production of oxygenated organic sulfur compounds, especially sulfonic acids, from organic compounds having the general formula $R_1S_nR_2$ wherein $R_1$ and $R_2$ are organic radicals and "$n$" is an integer having a value between 1 and 6, inclusive, especially from organic disulfides. A further object of this invention is to provide a catalytic process for the conversion of dialkyl disulfides to oxygenated organic sulfur compounds. Still another object of this invention is the provision of a process for the production of anhydrous sulfonic acids. One more object of this invention is to provide a catalytic process for the oxidation of organic sulfur compounds in the liquid phase at moderate temperatures. Further objects will become apparent as the description of this invention proceeds.

Briefly, we have found that oxygen can be introduced into organic sulfur compounds having the general formula $R_1S_nR_2$ by contacting them with a gas stream containing free oxygen and a small, catalytic proportion of a nitrogen oxide selected from the group consisting of NO, $NO_2$, $N_2O_3$, $N_2O_4$, and $N_2O_5$. The resulting oxidation products contain, depending upon the specific reaction conditions, sulfoxides, sulfones, and sulfonic acids. In order to produce sulfonic acids it is necessary to add water to the oxidation reaction mixture. The use of our invention renders possible the production of substantially anhydrous sulfonic acids at low cost in high yields from cheap feed stocks which are readily available as a by-product from commercial petroleum refinery operations.

Feed stocks for the catalytic oxidation process of our invention comprise organic sulfur compounds having general formula $R_1S_nR_2$. The organic radicals $R_1$ and $R_2$ may be the same or different. Organic radicals differing greatly in molecular weight or chemical structure may be present in the sulfur compounds used as feed stocks. However, the organic radicals may not be stable to oxidation under the reaction conditions employed in our process and, in that event, oxidation of both the sulfur atoms and organic radicals in the feed stock will occur. It is preferred, however, to select organic radicals which will be resistant to oxidation under the conditions employed in our process, with resultant confinement of the oxidation process to one or more of the sulfur atoms in the feed stock. Suitable oxidation resistant organic radicals are hydrocarbon radicals, especially alkyl and aryl radicals. Substituents which may or may not be oxidized under the conditions employed in our oxidation process may or may not be present in the feed stocks, e. g., an unsaturated organic linkage, such as olefin double bond, halogen, nitro, amino, amido, substituted amino or amido, carboxyl, hydroxy, or other atoms or groups.

Suitable feed stocks for the process of our invention include hydrocarbon disulfides, such as dimethyl, dipropyl, methyl butyl, ethyl propyl, dicresyl, dicyclohexyl, dicetyl, and dilauryl. Hydrocarbon thioethers are also suitable feed stocks, such as dimethyl sulphide, diisopropyl sulphide, dicetyl sulphide, methyl butyl sulphide, ethyl isopropyl sulphide, thiophene, dimethyl thiophene, dihydrothiophenes, thiophane, and dimethyl thiophane.

The feed stock may be a pure compound or a mixture of compounds, optionally in admixture with substances, such as paraffin hydrocarbons which are not normally oxidized to an appreciable extent under the conditions employed on our process. A preferred feed stock is a mixture consisting essentially of dialkyl disulfides, of the type obtained as a by-product in the extraction of mercaptans from petroleum distillates with a caustic-solutizer solution followed by regeneration of the solution in the presence of an oxidation catalyst to produce a mixture of dialkyl disulfides which are separated from the caustic solution by settling or by extraction with a solvent, such as petroleum hexane, naphtha, or the like. Either the crude disulfides or a fraction thereof can be oxidized by our technique.

The extraction of petroleum distillates with caustic-solutizer solutions has been described by D. L. Yabroff and E. R. White (Ind. Eng. Chem. 32, 950–953 (1940)) and has been reviewed by V. A. Kalichevsky and B. A. Stagner ("Chemical Refining of Petroleum"—revised edition—1942, pp. 218–220). The production of disulfides by catalytic oxidation of mercaptans (present as mercaptides) in caustic-solutizer solutions has been described by J. P. O'Donnell (The Oil and Gas Journal, pp. 45-47 (July 1, 1944)). However, a brief description of caustic-solutizer extraction of mercaptan-containing petroleum fractions and conversion of the extracted mercaptans to hydrocarbon disulfides may not be amiss.

A petroleum distillate, e. g., gasoline, is intimately mixed or countercurrently extracted with a solution of caustic alkali having a concentration of the order of 5–50%, preferably about 10-25% (equivalent to 2-7 N alkali). Sodium hydroxide and potassium hydroxide are commercially convenient. In order to increase the solubility of mercaptans, especially higher alkyl mercaptans such as butyl, amyl, and hexyl mercaptans, in the caustic solution a solubility promoter or "solutizer" is added to the caustic. Suitable solubility promoters are the simple phenols, particularly cresols and xylenols, the organic acids, particularly those having 3–7 carbon atoms such as isobutyric acid, aromatic acids such as cumic acid, the alcohols, glycols, amines, and hydroxyamines. The preferred amount of solubility promoter is about 5 to about 25 weight percent of the caustic solution which is employed. The mercaptans dissolve in the caustic solution and react therewith to form mercaptides. The mercaptide containing caustic solution is separated from the petroleum distillate and regenerated by blowing with air or oxygen, usually at a temperature between 50 and 200° F., which operation oxidizes the mercaptides to disulfides and liberates the bound caustic. In order to increase the rate of oxidation of the mercaptides, a catalyst is added to the caustic solution. Suitable catalysts are phenolic compounds, e. g., naturally occurring phenolic compounds such as the tannins. The resulting disulfides can be separated from the caustic solution by settling or extraction with naphthas or the like.

A representative dialkyl disulfide mixture produced from a light naphtha by the operation of a caustic-solutizer and catalytic caustic regeneration process of the type described above boils in the range of about 115 to about 400° F., with very little material distilling below about 250° F. Fractionation analysis indicates that the predominant components are di-methyl, methyl ethyl, diethyl, methyl isopropyl, methyl n-propyl, and dipropyl disulfides. From higher boiling naphthas it is possible to recover the higher boiling disulfides which can be oxidized by our process.

Polysulfides having the general formula $R_1S_nR_2$ wherein $R_1$ and $R_2$ are organic radicals and "$n$" is an integer between 3 and 6 can be oxidized by our catalytic process. Numerous methods of preparing such polysulfides are known. Suitable methods, among others, are described in U. S. Patents 2,237,625 and 2,237,627 and in Liebig's Annalen der Chemie 359, 81 (1907). It should be understood that the methods for making polysulfides form no part of the present invention and that polysulfides, however made, can be subjected successfully to our oxidation process.

In accordance with our invention, the organic sulfur compounds are oxidized by means of a gas stream containing free oxygen, as in air, in the presence of a small, catalytic quantity of one or more nitrogen oxides selected from the group consisting of $NO$, $NO_2$, $N_2O_3$, $N_2O_4$, and $N_2O_5$. Although all members of this group are useful, it is not intended to imply that they are equally efficacious in all respects. The organic sulfur compound is oxidized by the free oxygen and not by the nitrogen oxide or nitrogen oxides which can be recovered unchanged upon completion of the oxidation reaction and can be re-used to catalyze the oxidation of further quantities of organic sulfur compound with free oxygen. If desired, nitrogen oxides suitable for the purposes of our invention can be generated in situ by adding a small quantity of nitric acid to the oxidation zone. The nitric acid also yields water upon decomposing in the reaction zone. Water is a necessary reactant for the production of sulfonic acids from the oxidized sulfur compounds; thus, where sulfonic acids constitute a desired product, the addition of nitric acid to the reaction zone serves two purposes, generating both water and nitrogen oxide catalysts. The quantity of nitrogen oxide used as the catalyst will, naturally, vary with the particular nitrogen oxide selected for use, the particular feed stock, and the particular oxidation products being sought. In general, it may be said that less than 10% by weight of nitrogen oxides based on the total oxygen absorption is necessary, and usually the use of about 1 to about 5% by weight on total oxygen consumed is preferable. The nitrogen oxide catalyst can be introduced into the oxidation zone with either the organic sulfur compound feed stock or with the gas containing free oxygen, or with both, or may be introduced separately. The nitrogen oxide catalyst may be recovered from effluents passing from the oxidation zone and recycled to the same or a different oxidation zone.

The oxidation temperature and reaction period will be selected with reference to the particular feed stocks and the particular oxidation products being sought. The organic sulfur compound feed stocks may, by the process of our invention, be oxidized to various extents. Thus, sulfoxides, sulfones, and sulfonic acids may be produced, as shown by the following general, schematic formulations:

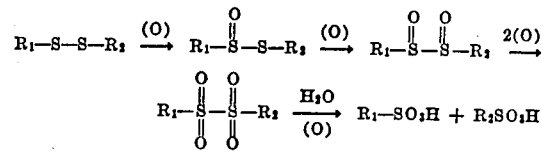

Where tri- and higher sulfides are used, extensive oxidation may oxidize some of the sulfur in the feed stock to $SO_3$ and, when water is present, sulfuric acid may be produced.

By proper control of temperature, oxygen-feed stock ratio and the period of reaction it is possible to obtain intermediate oxidation products short of sulfonic and sulfuric acid. As a rule, temperatures in the range of about 20 to about 250° F. may be used in our oxidation process, preferably temperatures in the range of about 50° F. to about 150° F. Where the oxidation of the sulfur compounds is effected in the presence of water to produce sulfonic acids, care must be taken not to exceed a reaction temperature in the general vicinity of 300° F., that is to say between about 250 and about 300° F., since appreciable decomposition of many sulfonic acids sets in at about this temperature, as evidenced by charring of the reaction mixture and evolution of sulfur dioxide therefrom. Sulfoxides and sulfones appear to be rather more resistant to thermal decomposition than sulfonic acids and can withstand higher temperatures. The reaction may be started at room temperature and, since the reaction is exothermic, the temperature of the reaction mixture increases; the rate of oxidation may thereafter be controlled by abstracting heat from the reaction zone at a rate sufficient to maintain the desired reaction temperature. Where the organic sulfur compound feed stock is maintained in the liquid phase during oxidation, the reaction temperature may be controlled by introducing a vaporizable inert liquid, e. g., petroleum hexane, into the oxidation zone and allowing it to vaporize from the oxidation mixture under controlled pressure, thus cooling the oxidation mixture by abstracting heat to arrive at the vaporization temperature and also by abstracting its latent heat of vaporization. Indirect heat exchange apparatus may also be used to control the temperature in the oxidation zone.

Ordinarily it is convenient and preferable to maintain the sulfur compound feed stock in the liquid phase during the oxidation reaction. This result can be readily attained by proper control of the pressure on the oxidation zone. Pressures in the range of about 5 to about 50 p. s. i. are convenient and generally sufficient. Other reaction conditions being constant, the rate of oxidation will increase with increasing partial pressures of oxygen in the oxidation zone. When using air or other gases containing relatively small proportions of oxygen, e. g., flue gases containing free oxygen, it is desirable to operate the oxidation zone under pressure to increase the oxygen concentration therein. The oxidation reaction may, however, be effected in the vapor phase, especially when relatively low-boiling sulfur compound feed stocks, e. g., feed stocks boiling below about 245° F., are employed.

The production of sulfonic acids from the sulfur compounds used as feed stocks in the oxidation process of our invention requires water as a reactant. This fact has been brought out by the equations given above, illustrating the conversion of a molecule of a disulfide to two molecules of a sulfonic acid. Ordinarily we prefer to add, an amount of water not in substantial excess of that required to combine with the oxidation products to produce sulfonic acids, i. e., one mol of water per mol of sulfonic acid anhydride produced in the oxidation reaction mixture. Accordingly, we can readily obtain substantially anhydrous sulfonic acids, e. g., 90 to 100% sulfonic acids. The anhydrous sulfonic acids are more desirable products than hydrated sulfonic acids or sulfonic acids in water solution, since, for many uses, the anhydrous acid is required. By adding no more, and preferably less, than the amount of water required to yield sulfonic acids we obviate the expensive operations attendant on concentrating and drying hydrous sulfonic acids. Ordinarily, a suitable proportion of water is within the range of about 1 to about 20 weight percent based on the feed stock.

The reaction period depends on the feed stock, other reaction variables and the products being sought. It can, in each case, be determined by simple experiment.

Our novel oxidation process may be carried out batchwise, continuously, or semi-continuously. The oxidation process may also be effected in a number of stages with or without product separation between stages. The oxidation reaction may be effected in conventional reaction kettles or autoclaves, or in a tubular convertor or contacting tower. A suitable form of reactor is a vertical tower provided with contacting means such as bubble cap trays or with packing such as ceramic bodies or fiber glass mats. Countercurrent contacting of liquid sulfur compound feed stock and the oxidizing gas stream proceeds efficiently in the types of reaction tower just described; the liquid feed is passed downwardly through the tower against a rising stream of oxidizing gas, all of which may be admitted at a point near the bottom of the tower or, preferably, aliquot portions of which are introduced at vertically spaced points along the tower. A tubular reactor equipped for spaced injection of oxidizing gas into a flowing stream of liquid or vaporized feed stock and oxidation products may also be employed; a reactor of this type permits fine control of the extent of oxidation.

The various individual oxidation products may be recovered from the reaction mixture by conventional means which will vary with the nature of the individual reaction product mixture. Such methods as extraction with solvents, fractional crystallization, distillation and the like may be used. Products and catalyst carried out of the oxidation zone by the effluent oxidizing gas stream may be recovered by cooling, absorption, or other processes. Partial oxidation products, when desired, and catalyst may be recycled to the oxidation zone.

The following examples are set forth with the intention of illustrating, but not limiting, our invention. Parts and percentages are by weight.

*Example I*

The feed stock was an oil obtained as a product of a caustic-solutizer gasoline extraction wherein the caustic was regenerated with air. The oil consisted chiefly of dialkyl disulfides containing 4 and 5 carbon atoms. This oil (487 parts) was treated at room temperature in the liquid phase with gaseous oxygen, which was absorbed at the rate of about 0.4 cubic feet per hour. The total amount of $NO_2$ catalyst used was about 20 parts. As oxygen was absorbed, the temperature of the reaction mixture rose to about 160° F. A small amount of water needed to form sulfonic acids was added in the course of the reaction. The product of the treatment consisted of about 60% of anhydrous alkyl sulfonic acids and 40% of oxygenated sulfur compounds, such as disulfones.

Similarly, n-butyl disulfide was converted to anhydrous butyl sulfonic acid in 80% of the theoretical yield.

*Example II*

A 25 cc. sample of pure diisobutyl disulphide was passed downwardly through a packed tower against a stream of oxygen containing about 5% of nitrogen dioxide. Treatment was continued for several hours, during which one ml. of water, about 0.3 cubic feet (standard conditions) of oxygen and about three grams of nitrogen dioxide were passed into the reaction tower. The product was titrated electrometrically and was found to contain 95.2% of isobutane sulfonic acid and no sulfuric or carboxylic acids. This example demonstrates that our oxidation process yields a substantially pure product, free of oxidative by-products. The only other materials in the oxidation product appear to be water and unreacted feed stock.

The numerous sulfoxides, sulfones, and sulfonic acids which are made available cheaply and in large quantities by the process of our invention are interesting materials for further chemical conversion and are adaptable to numerous uses.

Alkyl sulfonic acids, especially those wherein the alkyl group contains between about 1 and about 10 carbon atoms may be used as catalysts in numerous conversion operations, especially hydrocarbon conversion operations. They may be used as catalysts in processes wherein sulfuric acid has been employed and present the advantage thereover of not inducing undesirable side reactions such as sludge formation and oxidation reactions. The contemplated catalytic reactions wherein alkyl sulfonic acids may be applied include hydration of olefins, e. g., hydration of propylene to produce isopropyl alcohol, alkylation of olefins with paraffins, e. g., of isobutane with butylenes, polymerization of olefins, and isomerization of paraffin hydrocarbons. The alkyl sulfonic acids may be used with one or more auxiliary catalysts such as HF, $BF_3$, $FSO_3H$, $ClSO_3H$ and the like. The alkyl sulfonic acids can be readily esterified with olefins, e. g., at room temperature, by mixing.

We claim:
1. A process for introducing oxygen into an organic sulfur compound having the formula $R_1S_nR_2$ wherein $R_1$ and $R_2$ are hydrocarbon radicals and $n$ is an integer having a value between 1 and 6, inclusive, which comprises contacting said sulfur compound with a gas containing free oxygen and water in an amount not exceeding about 20 weight percent based on said sulfur compound, in the presence of catalytic quantity of a nitrogen oxide selected from the group consisting of NO, $NO_2$, $N_2O_3$, $N_2O_4$, and $N_2O_5$, and recovering an organic compound wherein a sulfur atom is chemically bound to an oxygen atom.

2. The process of claim 1 wherein $n$ is 1.

3. The process of claim 1 wherein the nitrogen oxide is $NO_2$.

4. A process for introducing oxygen into a mixture of dialkyl disulfides boiling in the range of about 115 to about 400° F. and containing predominantly 4 and 5 carbon atoms in the molecule which comprises contacting said mixture with a gas containing free oxygen in the presence of a catalytic quantity of a nitrogen oxide selected from the group consisting of NO, $NO_2$, $N_2O_3$, $N_2O_4$, and $N_2O_5$, and water in an amount not exceeding about 20 weight percent based on said sulfur compound, and recovering an organic compound wherein a sulfur atom is chemically bound to an oxygen atom.

5. A process for producing a substantially anhydrous sulfonic acid which comprises oxidizing a mixture of dialkyl disulfides boiling in the range of about 115 to about 400° F. and containing predominantly 4 and 5 carbon atoms in the molecule with a gas containing free oxygen in the presence of a catalytic quantity of a nitrogen oxide selected from the group consisting of NO, $NO_2$, $N_2O_3$, $N_2O_4$, and $N_2O_5$, and a small amount of water not substantially exceeding about one mol per mol of sulfonic acid anhydride produced by the oxidation, at a temperature in the range of about 20 to about 250° F. and recovering a substantially anhydrous sulfonic acid.

6. The process of claim 5 wherein the nitrogen oxide is $NO_2$.

7. A process for introducing oxygen into an organic sulfur compound having the formula $R_1S_nR_2$ wherein $R_1$ and $R_2$ are hydrocarbon radicals and $n$ is 2, which process comprises contacting said organic sulfur compound with a gas containing free oxygen and water in an amount not exceeding about 20 weight per cent based on said organic sulfur compound in the presence of a catalytic quantity of a nitrogen oxide selected from the group consisting of NO, $NO_2$, $N_2O_3$, $N_2O_4$, $N_2O_5$, and recovering an organic compound wherein a sulfur atom is chemically bound to an oxygen atom.

8. The process of claim 7 wherein the nitrogen oxide is $NO_2$.

9. A process for introducing oxygen into a dialkyl disulfide, which comprises contacting said disulfide with a gas containing free oxygen and water in an amount not exceeding about 20 weight per cent based on said disulfide in the presence of a catalytic quantity of a nitrogen oxide selected from the group consisting of NO, $NO_2$, $N_2O_3$, $N_2O_4$, $N_2O_5$, and recovering an organic compound wherein a sulfur atom is chemically bound to an oxygen atom.

10. The process for producing a sulfonic acid which comprises oxidizing a dialkyl disulfide at a temperature below the general vicinity of 300° F. with a gas containing free oxygen in the presence of a catalytic quantity of a nitrogen oxide selected from the group consisting of NO, $NO_2$, $N_2O_3$, $N_2O_4$, $N_2O_5$, and water in an amount between about 1 and about 20 weight per cent based on said disulfide, and recovering a sulfonic acid.

11. The process of claim 10 wherein the nitrogen oxide is $NO_2$.

12. A process for producing a substantially anhydrous sulfonic acid which comprises oxidizing a dialkyl disulfide with a gas containing free oxygen in the presence of a catalytic quantity of a nitrogen oxide selected from the group consisting of NO, $NO_2$, $N_2O_3$, $N_2O_4$, $N_2O_5$, and a small amount of water not substantially exceeding about 1 mol per mol of sulfonic acid anhydride produced by the oxidation, at a temperature in the range of about 20 to about 250° F., and recovering a substantially anhydrous sulfonic acid.

13. A process for producing substantially anhydrous methanesulfonic acid which comprises oxidizing dimethyl disulfide with a gas containing free oxygen in the presence of a catalytic quantity of a nitrogen oxide selected from the group consisting of NO, $NO_2$, $N_2O_3$, $N_2O_4$, $N_2O_5$, and a small amount of water not substantially exceeding about 1 mol per mol of sulfonic acid anhydride produced by the oxidation, at a temperature in the range of about 20 to about 250° F., and recovering substantially anhydrous methanesulfonic acid.

14. The process for producing a sulfonic acid which comprises oxidizing an organic sulfur compound having the formula $R_1S_nR_2$ wherein $R_1$ and $R_2$ are hydrocarbon radicals and $n$ is 2 with a gas containing free oxygen in the presence of a catalytic quantity of a nitrogen oxide selected from the group consisting of NO, $NO_2$, $N_2O_3$, $N_2O_4$, $N_2O_5$, and water in an amount between about 1 and about 20 weight per cent based on said organic sulfur compound, and recovering a sulfonic acid.

15. The process of claim 14 wherein the oxidation is effected at a temperature below the general vicinity of 300° F.

16. A process for producing a substantially anhydrous sulfonic acid which comprises oxidizing an organic sulfur compound having the formula $R_1S_nR_2$ wherein $R_1$ and $R_2$ are hydrocarbon radicals and $n$ is 2 with a gas containing free oxygen in the presence of a catalytic quantity of a nitrogen oxide selected from the group consisting of NO, $NO_2$, $N_2O_3$, $N_2O_4$, $N_2O_5$, and a small amount of water not substantially exceeding about 1 mol per mol of sulfonic acid anhydride produced by the oxidation, at a temperature in the range of about 20 to about 250° F., and recovering a substantially anhydrous sulfonic acid, 17. The process for producing a sulfonic acid from a dialkyl disulfide containing at least one primary alkyl group, which process comprises contacting said disulfide with a gas containing free oxygen in the presence of a catalytic quantity of a nitrogen oxide selected from the group consisting of NO, $NO_2$, $N_2O_3$, $N_2O_4$, $N_2O_5$, and water in an amount between about 1 and about 20 weight per cent based on said disulfide, and recovering a sulfonic acid.

18. The process of claim 17 wherein the nitrogen oxide is $NO_2$.

19. The process for producing a sulfonic acid from a dialkyl disulfide containing at least one secondary alkyl group, which process comprises contacting said disulfide with a gas containing free oxygen and water in an amount between about 1 and about 20 weight per cent based on said disulfide in the presence of a catalytic quantity of a nitrogen oxide selected from the group consisting of NO, $NO_2$, $N_2O_3$, $N_2O_4$, $N_2O_5$, and recovering a sulfonic acid.

20. The process of claim 19 wherein the nitrogen oxide is $NO_2$.

21. A process for producing a substantially anhydrous sulfonic acid from a dialkyl disulfide containing at least one primary alkyl group, which comprises contacting said disulfide with a gas containing free oxygen in the presence of a catalytic quantity of a nitrogen oxide selected from the group consisting of NO, $NO_2$, $N_2O_3$, $N_2O_4$, $N_2O_5$, and a small amount of water not substantially exceeding about 1 mol per mol of sulfonic acid anhydride produced by the oxidation, at a temperature in the range of about 20 to about 250° F., and recovering a substantially anhydrous sulfonic acid.

22. A process for producing a substantially anhydrous sulfonic acid from a dialkyl disulfide containing at least one secondary alkyl group, which process comprises contacting said disulfide with a gas containing free oxygen in the presence of a catalytic quantity of a nitrogen oxide selected from the group consisting of NO, $NO_2$, $N_2O_3$, $N_2O_4$, $N_2O_5$, and a small amount of water not substantially exceeding about 1 mol per mol of sulfonic acid anhydride produced by the oxidation, at a temperature in the range of about 20 to about 250° F., and recovering a substantially anhydrous sulfonic acid.

WAYNE A. PROELL.
BERNARD H. SHOEMAKER.

REFERENCES CITED

The following references are of record in the file of this patent:

UNITED STATES PATENTS

| Number | Name | Date |
| --- | --- | --- |
| 1,908,935 | Tschunkur | May 16, 1933 |
| 1,662,664 | Flemming | Mar. 13, 1928 |

FOREIGN PATENTS

| Number | Country | Date |
| --- | --- | --- |
| 335,601 | Germany | Apr. 8, 1921 |